Feb. 28, 1950      C. B. DOTY      2,498,852
WEATHER STRIP FOR VEHICLE DOORS
Original Filed Sept. 25, 1942      2 Sheets-Sheet 1
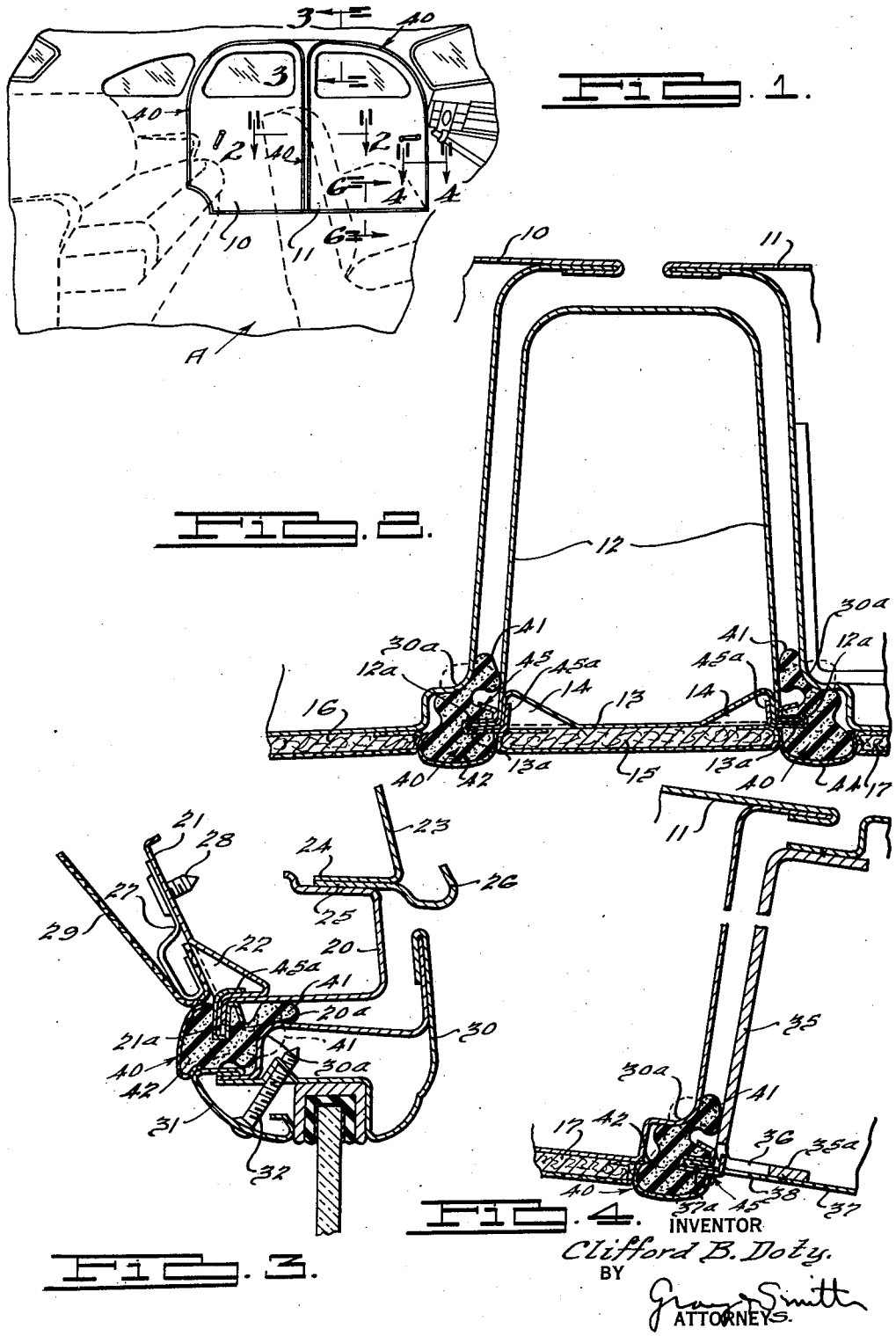
INVENTOR
Clifford B. Doty.
BY
ATTORNEYS.

Feb. 28, 1950     C. B. DOTY     2,498,852
WEATHER STRIP FOR VEHICLE DOORS
Original Filed Sept. 25, 1942     2 Sheets—Sheet 2
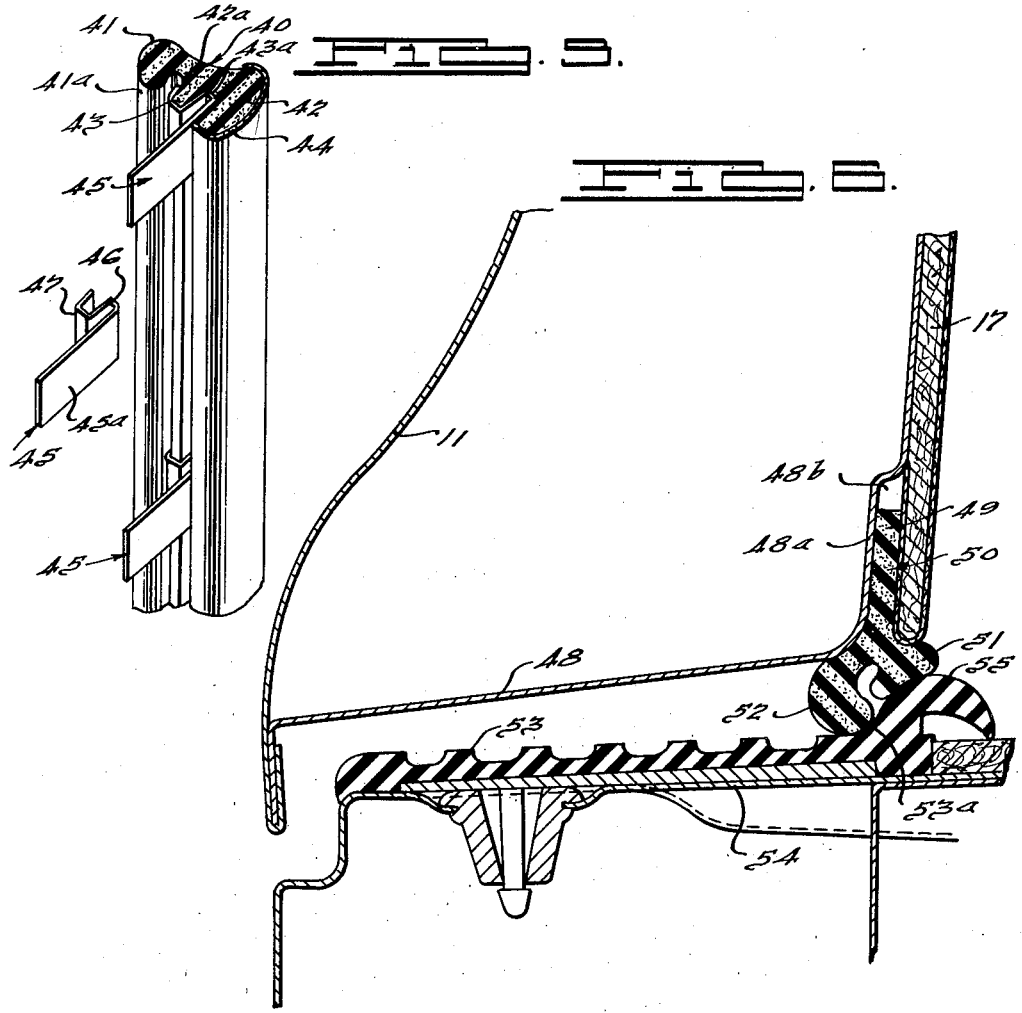
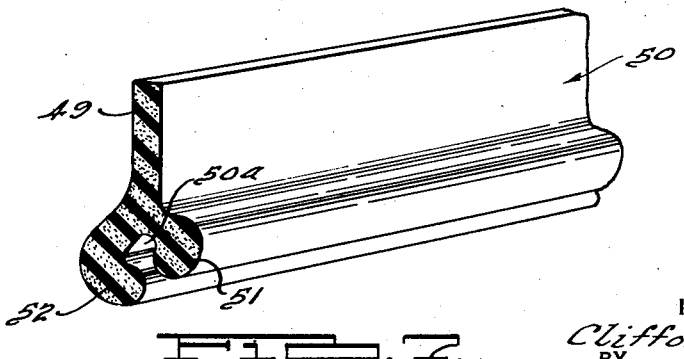
INVENTOR
Clifford B. Doty.
BY
ATTORNEYS.

Patented Feb. 28, 1950

2,498,852

UNITED STATES PATENT OFFICE 2,498,852

WEATHER STRIP FOR VEHICLE DOORS

Clifford B. Doty, Detroit, Mich., assignor to Briggs Manufacturing Company, Detroit, Mich., a corporation of Michigan Substituted for abandoned application Serial No. 459,659, September 25, 1942. This application November 6, 1946, Serial No. 708,079

7 Claims. (Cl. 296—44)

This invention relates to weatherstripping adapted particularly, although not exclusively, for use around the door openings of motor vehicle bodies and the like to seal the spaces or joints between the doors and the adjacent portions of the body around the door openings.

One of the objects of the present invention is to provide improved means of a yieldable or elastic nature for effecting a seal around a door opening, when the door is closed, such means being easy to install and having the advantage of providing uniform contact with the door and door frame along spaced parallel lines whereby a single means is capable of providing a double seal.

Another object of the invention is to provide an elastic or yieldable weatherstrip for a door capable of sealing at two points and constructed so as to permit elimination of the windlace customarily used as a sealing medium along the inside of the door openings of automobile bodies.

A further object of the present invention is to provide improved resilient or elastic weatherstripping or sealing material in strips or lengths provided with deformable metallic attaching and supporting elements located at spaced points in the length of the strips and constructed to facilitate quick and easy installation of the strips to the body structure surrounding the door openings.

Another object of the invention is to provide an improved weatherstrip or seal which can be readily installed in the body without necessitating any structural change in the body parts to which it is applied; and one in which the metal attaching and supporting means or members can be deformed or bent into gripping engagement with the body parts, as by means of a blow from a hammer or other suitable tool.

A further object of the present invention is to provide improved weatherstripping or sealing material which is of relatively simple construction and which can be manufactured at relatively low cost and applied or installed with ease and facility.

Another object of the invention is to provide improved compressible means extending continuously around three sides of a vehicle door opening for sealing the space around three sides of the door and separate sealing means carried by the door itself for sealing the space at the fourth side of the door.

The above and other objects and advantages of the present invention will appear from the following description and appended claims when considered in connection with the accompanying drawings forming a part of this specification wherein like reference characters designate similar parts in the several views.

Fig. 1 is a fragmentary perspective view of the interior of a motor vehicle body illustrating one application of the present invention.

Fig. 2 is an enlarged horizontal sectional view taken substantially along the line 2—2 of Fig. 1, looking in the direction of the arrows.

Fig. 3 is an enlarged fragmentary vertical sectional view taken substantially along the line 3—3 of Fig. 1, looking in the direction of the arrows.

Fig. 4 is an enlarged horizontal sectional view taken substantially along the line 4—4 of Fig. 1, looking in the direction of the arrows.

Fig. 5 is a perspective view of a portion or length of weatherstripping or sealing material embodying the present invention.

Fig. 6 is an enlarged fragmentary vertical sectional view taken substantially along the line 6—6 of Fig. 1, looking in the direction of the arrows.

Fig. 7 is an enlarged perspective view of a portion or length of another form of weatherstripping or sealing material embodying the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

This application is a substitute for abandoned application No. 459,659, filed September 25, 1942.

In the drawings I have illustrated, by way of example, one embodiment of the invention as applied to an automobile body indicated at A in Fig. 1. The body is of any conventional construction having lefthand rear and front doors 10 and 11, respectively, and a center body pillar 12, see Fig. 2. This pillar is of channel construction having opposed jamb faces terminating in out-turned flanges 12a, the open side of the pillar being closed or boxed in by a metal closure or facing plate 13 having out-turned flanges 13a engaging and spot-welded to the flanges 12a. The plate or strip 13 is embossed to provide a number of outwardly extending depressions, pockets or recesses 14 along each vertical side edge of the pillar. The metal plate or strip 13, in the finished car, is concealed by the usual trim panel 15 secured thereto in any conventional manner. Likewise the inner faces of the rear and front doors are finished by means of trim panels 16 and 17.

Referring to Fig. 3, each door frame of the body is provided with a channel roof rail 20 along the top edge of the door opening. This rail has a jamb face terminating at its inner edge in a depending flange 20a secured by spot-welding to a corresponding flange 21a of an upright angle member 21. The member 21 is embossed to provide a number of depressions or pockets 22 along the upper edge of the door frame, these pockets being generally similar to pockets 14 and designed for similar purposes, as later explained.

As shown in Fig. 3, the roof panel 23 is flanged inwardly at 24 to meet the roof rail, the flange 25 of a drain gutter 26 being interposed between the parts. The member 21, which forms part of the roof rail or header 20, carries a suitable retainer 27, secured thereto by screws 28, for the headlining 29. The top cross frame member of the door 11 is shown at 30, Fig. 3. Secured thereto along the inner top edge of the window reveal by screws 32 is a garnish molding 31 of any conventional type. It will be understood that the construction of Fig. 3 applies to either the front or rear door of the vehicle.

Referring to Fig. 4, the front body pillar is shown at 35. This pillar is channel-shaped and the inner vertical flange 35a thereof along the corner proximate to the door opening is pierced or punched to provide a series of vertically spaced slots or openings 36. The inner body panel 37 is spot-welded to the flange 35a and terminates along the door opening in a return bent flange 37a extending beyond the web or jamb face of the pillar 35 into the door opening. This panel 37 is pierced to provide openings or slots 38 registering with the slots 36.

Referring to Fig. 5, the weatherstrip or sealing strip constructed in accordance with the present invention is designated as a whole at 40. It is preferably formed from sponge rubber so as to present characteristics of yield and compressibility in any direction with rapid return to normal shape when released from strain or stress. The shape of the strip, when free of stress or distortion, is illustrated in Fig. 5. Along its inner edge the strip is broadened out to provide a body portion 42 of curved contour. A relatively narrow web or neck 42a connects the body 42 with what is herein termed for convenience a tail portion 41 which is offset more to one side than the other to form a longitudinal rib 41a of curved contour. The neck 42a is also formed with a longitudinal rib 43 along one side which forms with the head 42 a narrow longitudinal slot or channel 43a in the rubber strip extending throughout the length thereof. The exposed curved face of the body 42 is preferably covered with a strip of trim material 44 which may be fabric similar to the fabric used on the trim panels.

The strip 40 is attached to the body in the present instance by means of metal clips 45 preferably stamped from sheet metal. The clip has a return bent rib 46 adapted to fit into the channel 43a in the rubber strip. This rib is extended laterally and again return bent to form a channel 47 adapted to embrace the rib 43 of the rubber strip. The interfitting parts of the clip and rubber strip are permanently secured together by vulcanizing, cementing or otherwise. When thus assembled the clip has a flat section or tab 45a extending laterally at right angles to the strip 42. Although I prefer to use a number of separated clips 45 at spaced intervals along the length of the sealing strip 40, it will be understood that the invention contemplates the use of longer metal strips having the cross-sectional contour shown at 46 and 47 to interfit with the sealing strip and formed at intervals with tabs 45.

In other words, the several clips or any number of the clips 45 may thus be connected in a strip or strips if desired.

It is preferred that a single rubber strip 40 be used for sealing three sides of the door opening when the door 10 or 11 is closed. Such a strip would have a length sufficient to extend continuously from the floor up one side, across the top and down the other side to the floor, the flexible character of the strip permitting it to be bent at the corners of the door opening. As illustrated in Figs. 2, 3 and 4, the strip is installed on the body with certain of the tabs 45a opposite the pockets 14 in the center pillar 12, others of the tabs opposite the pockets 22 in the roof rail member 21, and the remaining tabs opposite the slots or openings 36, 38 in the pillar 35 and body panel 37, respectively. It will be understood that the clips 45 are attached in the first instance to the strip 40 at the proper intervals so that the tabs 45a will line up or register with the pockets 14 and 22 and the apertures 36, 38.

The weatherstrip is easily installed by fitting the continuous channel or grooved portion 43a of the rubber strip and the channel portions 46 of the clips over the flanges 12a, 13a of the center pillar (Fig. 2); the flanges 20a, 21a of the roof rail (Fig. 3); and the return bent double flange 37a of the inner body panel 37 (Fig. 4). Thereupon the tabs are hammered or otherwise bent tightly into the pockets 14, 22 and the apertures 36, 38, as shown in Figs. 2, 3 and 4. This firmly anchors the weatherstrip to the body since the tabs are, as shown, hooked or bent tightly around the corners of the pockets and around the edges of the apertures 36, 38. This is a very simple and rapid installation operation which requires no precision work at all.

The construction of the weatherstrip is such that the tail portion 41 extends into the path of the outer rabbeted edge or corner 30a of the door with the rib 41a facing and preferably touching the adjacent jamb faces of the pillars and roof rail, as shown in dotted lines in Figs. 2, 3 and 4. The narrow neck 42a permits distortion, as indicated in these figures, without too much resistance to the closing of the door. The body portion 42 of the weatherstrip is wide enough to span the spaces between the trim panels 15, 16 and 17 of Fig. 2, being preferably placed slightly under stress or compression by the edge of trim panel 16 or 17 when the door is closed. This portion 42 of the weatherstrip serves as a second sealing member, taking the place of the conventional windlace, and providing an attractive closing bead to fill the gaps between the trim panels 15, 16 and 17. The body 42 also fills the gap between the garnish molding 31 and the headlining fabric 29 along the top of the door, as shown in Fig. 3, serving the same purpose of a finishing bead as at the side of the door opening. This also applies to the front side of the door 11, as shown in Fig. 4, as well as the top and side edges of the rear door 10, it being understood that the construction illustrated in Figs. 2, 3 and 4 is applicable to all doors of the car.

The width of the body 42 is preferably such that the corner of the garnish molding 31 contacts it when the door is closed so as to provide a good seal, as shown in Fig. 3. Similarly, the edge of the trim panel 17 engages the body 42 at the front or hinged edge of the door, as shown in Fig. 4, so as to afford a good seal along this edge of the door opening. Thus, in the manner shown in Figs. 2, 3 and 4 a continuous double seal is provided around three sides of the door opening by means of a single strip 40.

The bottom edge of the door opening may be sealed, when the door is closed, in the manner illustrated in Figs. 6 and 7. The inner face of the bottom rail 48 of the door is pressed outwardly at 48a across the width of the door to provide a recess 48b between the portion 48a and the lower edge portion of the trim panel 17. Into this recess fits the web or lip 49 of a sponge rubber weatherstrip 50 which is securely anchored therein. The weatherstrip terminates in two spaced rounded beads or ribs 51 and 52. The inner bead or rib is somewhat higher and of less mass than the outer bead or rib 52, the two being separated by a slot or channel 50a. The door closes over the sill or threshold member 54 preferably covered by a running board rubber mat 53 terminating beneath the inner face of the door in an arched resilient lip 55. The lip 55 is stiffer than the bead 51 so that when the door closes engagement of the bead 51 with the arched lip 55 results in partial flattening or collapse of the bead 51, thereby producing an effective seal along the entire lower edge of the door. Moreover, as shown in Fig. 6, the lower bead 52 of the weatherstrip engages the mat 53 substantially at the curved corner 53a where the lip 55 merges into the bottom of the mat. Thus, a double seal is provided along the lower edge of the door by virtue of the beads 51 and 52.

I claim:

1. In a vehicle body having a door frame provided with a jamb face terminating in a flange extending transversely thereof toward the edge of the door, an elastic weatherstrip provided with a longitudinal groove into which said flange extends and a rib adjacent and parallel thereto, and a metal clip having a channel embracing said rib and a portion extending into said groove and overlapped at opposite sides by the side walls of the groove and permanently secured to said walls, said clip also having a tab projecting laterally from the strip and adapted to be anchored in a recess in said door frame, said strip having portions at opposite sides of said groove for engagement by spaced edge portions of the door.

2. In a vehicle body having a door frame provided with a jamb face terminating in a flange extending transversely thereof toward the edge of the door, an elastic weatherstrip provided with a longitudinal groove into which said flange extends and a rib adjacent and parallel thereto, and a metal clip having reversely formed channel portions, one embracing said rib and the other channel portion embracing said flange, said last named channel portion extending into said groove and overlapped at opposite sides by the side walls of the groove and permanently secured to said side walls, said clip also having a tab projecting laterally from the strip and adapted to be anchored in said door frame.

3. In a vehicle body having a door frame provided with a jamb face terminating in a flange extending transversely thereof toward the edge of the door, an elastic weatherstrip provided with a longitudinal groove into which said flange extends and a rib adjacent and parallel thereto, and a metal clip having reversely formed channel portions, one embracing said rib and the other channel portion embracing said flange, said last named channel portion extending into said groove and overlapped at opposite sides by the side walls of the groove and permanently secured to said side walls, said clip also having a tab projecting laterally from the strip and adapted to be anchored in said door frame, said strip having portions at opposite sides of said flange for engagement by spaced edge portions of the door.

4. In a vehicle body having a door frame provided with a jamb face terminating in a flange extending transversely thereof toward the edge of the door, an elastic weatherstrip provided with a longitudinal groove into which said flange extends and a rib adjacent and parallel thereto, and a metal clip having a channel embracing said rib and a portion extending into said groove and overlapped at opposite sides by the side walls of the groove and permanently secured to said walls, said clip also having a tab projecting laterally from the strip and adapted to be anchored in a recess in said door frame.

5. In a vehicle body having a door frame provided with a jamb face terminating in a flange extending outwardly thereof into the door opening, a resilient weatherstrip provided with a longitudinal groove into which said flange extends and a rib adjacent and parallel thereto, and a metal piece having a channel embracing said rib and a channel portion extending into said groove and adapted to embrace said flange for attaching said piece to said door frame, said channel portion being overlapped at opposite sides by the side walls of the groove and permanently secured to said walls, and said channel portion having a projecting tab bendable transversely of the plane of said flange into a pocket or recess in the frame.

6. In a vehicle body having a jamb member terminating in a transverse edge extending outwardly into the door opening, a flexible weatherstrip having a longitudinal groove receiving said edge therein, and a metallic attaching piece having a grooved portion receiving said edge, said attaching piece having a portion extending into the groove of the weatherstrip and overlapped at opposite sides by the side walls of the groove and permanently secured to said walls, said attaching piece also having a projecting portion bendable transversely of the plane of said edge into a pocket or recess in the jamb member.

7. In a vehicle body having a door frame provided with a jamb face having a flange extending outwardly of the jamb face into the door opening, a metal piece having adjacent reversely formed channels one opening toward the frame and embracing said flange and the other opening away from said frame, a yieldable weatherstrip having a groove within which said first mentioned channel extends, the latter being overlapped at opposite sides by the side walls of the groove and permanently secured to said side walls, said weatherstrip having a portion anchored in said second mentioned channel and having another portion adapted to project into position for engagement by the door when closed, the inner wall of the first mentioned channel having an extension bendable transversely of said flange across the inner terminus thereof into a recess or pocket in the frame.

CLIFFORD B. DOTY.

(References on following page)

REFERENCES CITED

The following references are of record in the file of this patent:

UNITED STATES PATENTS

| Number | Name | Date |
|---|---|---|
| 1,613,044 | Marshall | Jan. 4, 1927 |
| 1,738,350 | Buckhout | Dec. 3, 1929 |
| 1,836,094 | Toncray | Dec. 15, 1931 |
| 2,099,912 | Travis | Nov. 23, 1937 |
| 2,165,399 | McCormick | July 11, 1939 |
| 2,226,615 | Killen | Dec. 3, 1940 |